United States Patent
Freeman et al.

(10) Patent No.: US 7,589,759 B1
(45) Date of Patent: Sep. 15, 2009

(54) VERTICAL 3D IMAGING METHOD

(76) Inventors: Richard Stewart Freeman, 9532 - B State Rd., Philadelphia, PA (US) 19114; Christopher J Ellis, 184 E. Willow Grove Ave., Philadelphia, PA (US) 19118

( * ) Notice: Subject to any disclaimer, the term of this patent is extended or adjusted under 35 U.S.C. 154(b) by 878 days.

(21) Appl. No.: 11/053,265

(22) Filed: Feb. 7, 2005

Related U.S. Application Data

(60) Provisional application No. 60/542,539, filed on Feb. 7, 2004.

(51) Int. Cl.
*H04N 13/02* (2006.01)
*H04N 15/00* (2006.01)

(52) U.S. Cl. ........................................................ 348/49
(58) Field of Classification Search ........................ None
See application file for complete search history.

(56) References Cited

U.S. PATENT DOCUMENTS

| | | | |
|---|---|---|---|
| 3,723,904 A * | 3/1973 | Bernier | 40/701 |
| 5,790,284 A * | 8/1998 | Taniguchi et al. | 359/15 |
| 6,121,972 A * | 9/2000 | Takahashi et al. | 345/419 |
| 6,614,427 B1 * | 9/2003 | Aubrey | 345/419 |
| 6,657,998 B2 * | 12/2003 | Li | 370/360 |
| 7,364,300 B2 * | 4/2008 | Favalora et al. | 353/7 |

* cited by examiner

*Primary Examiner*—Nhon T Diep
(74) *Attorney, Agent, or Firm*—LaMorte & Associates

(57) ABSTRACT

A method for creating three dimensional images which are seen to project vertically upwards from the image display surface and which give the impression of a three dimensional image in a vertical and up-right orientation relative to the placement of the image display surface and the viewing position of the viewer whereby the image is placed in a horizontal orientation and perpendicular to the viewer's seated or standing position, and which then requires that the image is viewed from above and in a placement forward of and relative to the viewer which creates an approximate look-down viewing angle of 45 degrees.

1 Claim, 5 Drawing Sheets

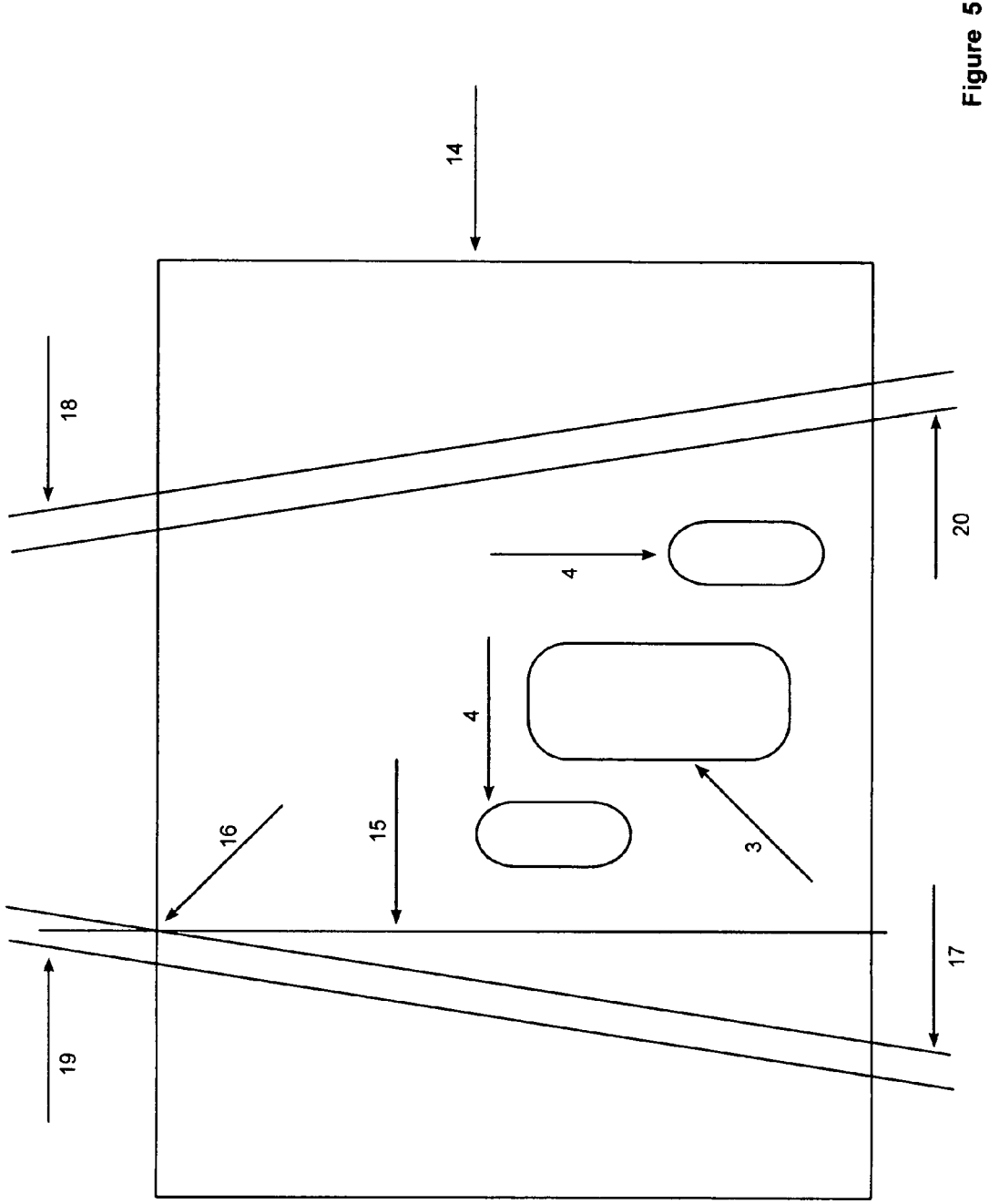

VERTICAL 3D IMAGING METHOD

REFERENCE TO PROVISIONAL PATENT APPLICATION

This application claims priority of U.S. Provisional Patent Application No. 60/542,539, entitled Vertical 3D Imaging Method, filed Feb. 7, 2004

BACKGROUND OF THE INVENTION

1. Field of the Invention

The present invention relates generally to anaglyphic and stereoscopic 3D imaging methods and more specifically it relates to vertical 3D imaging methods for creating three-dimensional images which are seen to project vertically upwards from the image surface.

2. Description of the Prior Art

It can be appreciated that anaglyphic and stereoscopic 3D imaging methods have been in use for years. Typically, anaglyphic and stereoscopic 3D imaging methods are comprised of a variety of three dimensional imaging methods which generally portray a three dimensional image in a standard viewing orientation whereby the image display surface is placed in a vertical orientation and parallel to the viewer's seated or standing position, which then requires that the image is viewed from straight ahead and in a placement in front of the viewer and relative to the viewer's standing or seated position which creates an approximate straight ahead viewing angle of 90 degrees of offset from the viewer's seated or standing position.

The main problem with the conventional anaglyphic or stereoscopic 3D imaging methods is that the standard 3D imaging methods generally provide only limited depth receding into the background of the scene. Another problem with the conventional anaglyphic or stereoscopic 3D imaging methods is that the standard 3D imaging methods provide only limited capability for projecting dimensional perspective forward of the plane of the image display surface. Another problem with the conventional anaglyphic or stereoscopic 3D imaging methods is that the standard 3D imaging methods have been in the marketplace and practiced in their current forms for approximately 100 years and as such do not provide a new and unique display opportunity for potential commercial users.

While these devices may be suitable for the particular purpose for which they are intended, they are not suitable for providing a method for creating three dimensional images which are seen to project vertically upwards from the image display surface and which give the impression of a three dimensional image in a vertical and up-right orientation relative to the placement of the image display surface and the viewing position of the viewer whereby the image is placed in a horizontal orientation and perpendicular to the viewer's seated or standing position, and which then requires that the image is viewed from above and in a placement forward of and relative to the viewer which creates an approximate look-down viewing angle of 45 degrees of offset from the viewer's seated or standing position. The main problem with the conventional anaglyphic or stereoscopic 3D imaging methods is that the standard 3D imaging methods generally provide only limited depth receding into the background of the scene. Another problem is that the standard 3D imaging method provides only limited capability for projecting dimensional perspective forward.

In these respects, the new and unique vertical 3D imaging method according to the present invention substantially departs from the conventional concepts and designs of the prior art, and in so doing provides a process specifically developed for the purpose of providing a new and unique method for creating three dimensional images which are seen to project vertically upwards from the image display surface and which give the impression of a three dimensional image in a vertical and up-right orientation relative to the placement of the image display surface and the viewing position of the viewer whereby the image is placed in a horizontal orientation and perpendicular to the viewer's seated or standing position, and which then requires that the image is viewed from above and in a placement relative to the viewer which creates an approximate look-down viewing angle of 45 degrees of offset from the viewer's seated or standing position.

SUMMARY OF THE INVENTION

In view of the foregoing disadvantages inherent in the known types of anaglyphic or stereoscopic 3D imaging methods now present in the prior art, the present invention provides a new and unique vertical 3D imaging method wherein the same can be utilized for creating three dimensional images which are seen to project vertically upwards from the image display surface and which give the impression of a three dimensional image in a vertical and up-right orientation relative to the placement of the image display surface and the viewing position of the viewer whereby the image is placed in a horizontal orientation and perpendicular to the viewer's seated or standing position, and which then requires that the image is viewed from above and in a placement relative to the viewer which creates an approximate look-down viewing angle of 45 degrees of offset from the viewer's seated or standing position.

The general purpose of the present invention, which will be described subsequently in greater detail, is to provide a new and unique vertical 3D imaging method that has many of the advantages of the anaglyphic or stereoscopic 3D imaging methods mentioned heretofore and many novel features that result in a new and unique vertical 3D imaging method which is not anticipated, rendered obvious, suggested, or even implied by any of the prior art anaglyphic or stereoscopic 3D imaging methods, either alone or in any combination thereof.

To attain this, the present invention generally comprises the processes of a new and unique imaging method, which involves the following elements: 1. specific camera placement for height and distance from the primary subject, 2. specific camera angle of look-down, 3. specific focal length of camera lens, 4. specific placement of the central registration line, 5. specific placement of left and right registration guide lines, 6. creation of left and right anaglyphic or stereoscopic images, each with left and right registration guide lines equal in distance of separation to the distance of separation between the left and right registration guide lines of the original image scene, 7. superimposing of left and right anaglyphic or stereoscopic images over each other, 8. placement of the registration match line, 9. matching of the left registration guide line of the right anaglyphic or stereoscopic image to the registration match line, and 10. precise alignment and matching of the registration guide lines in both of the left and right anaglyphic or stereoscopic images with the registration match line.

There has thus been outlined, rather broadly, the more important features of the invention in order that the detailed description thereof may be better understood, and in order that the present contribution to the art may be better appreciated. There are additional features of the invention that will be further described hereinafter.

In this respect, before explaining at least one embodiment of the invention in detail, it is to be understood that the invention is not limited in its practice or application to the details of the process and method, and/or to the arrangements of the component elements of the process and method as set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a new and unique vertical 3D imaging method that will overcome the shortcomings of the prior art devices.

An object of the present invention is to provide a new and unique vertical 3D imaging method for creating three dimensional images which are seen to project vertically upwards from the image display surface and which give the impression of a three dimensional image in a vertical and up-right orientation relative to the placement of the image display surface and the viewing position of the viewer whereby the image is placed in a horizontal orientation and perpendicular to the viewer's seated or standing position, and which then requires that the image is viewed from above and in a placement forward of and relative to the viewer which creates an approximate look-down viewing angle of 45 degrees of offset from the viewer's seated or standing position.

Another object is to provide a vertical 3D imaging method that by the method, process and technology described herein, as well as further methods, processes and technologies which may be developed through ongoing experimentation with, and advances and refinements of, the principles, methods and techniques outlined herein, will display and present a three dimensional image in a vertical orientation to the image display surface when the image display surface is placed in a horizontal orientation equivalent and parallel to the apparent floor or ground plane displayed within the image and equivalent and parallel to the viewer's floor or ground plane relative to the viewer's seated or standing position and thereby creating a viewing position which requires the viewer to look down from above at an approximate look-down viewing angle of 45 degrees of offset from the viewer's seated or standing position.

Another object is to provide a vertical 3D imaging method that by the method, process and technology described herein, as well as further methods, processes and technologies which may be developed through ongoing experimentation with, and advances and refinements of, the principles, methods and techniques outlined herein, will produce vertical three dimensional images which are capable of being displayed and viewed in anaglyphic, stereoscopic, autostereoscopic, holographic and/or lenticular formats.

Another object is to provide a vertical 3D imaging method that by the method, process and technology described herein, as well as further methods, processes and technologies which may be developed through ongoing experimentation with, and advances and refinements of, the principles, methods and techniques outlined herein, will produce vertical three dimensional images which are capable of being displayed and viewed on various types of printed media, including but not limited to paper, plastic and/or lenticular materials.

Another object is to provide a vertical 3D imaging method that by the method, process and technology described herein, as well as further methods, processes and technologies which may be developed through ongoing experimentation with, and advances and refinements of, the principles, methods and techniques outlined herein, will produce vertical three dimensional images which are capable of being displayed and viewed on various types of electronic display media, including but not limited to CRT, LCD, LED, OLED and/or plasma display screens.

Another object is to provide a vertical 3D imaging method that by the method, process and technology described herein, as well as further methods, processes and technologies which may be developed through ongoing experimentation with, and advances and refinements of, the principles, methods and techniques outlined herein, will make possible the production of vertical three dimensional still images in a digital format for display on various types of electronic display media.

Another object is to provide a vertical 3D imaging method that by the method, process and technology described herein, as well as further methods, processes and technologies which may be developed through ongoing experimentation with, and advances and refinements of, the principles, methods and techniques outlined herein, will make possible the production of vertical three dimensional animated images and animated image sequences in a digital format for display on various types of electronic display media.

Another object is to provide a vertical 3D imaging method that by the method, process and technology described herein, as well as further methods, processes and technologies which may be developed through ongoing experimentation with, and advances and refinements of, the principles, methods and techniques outlined herein, will make possible the development of a system for, and the production of vertical three dimensional images by, expressing and describing the dimensional and spatial relationship of the component elements of the method, process and technology described herein as mathematical formulas which may be applied to the processing of vertical three dimensional images and animated image sequences in the same manner as the method described herein and which will achieve the same vertical three dimensional image results as the image manipulation method described herein.

Another object is to provide a vertical 3D imaging method that by the method, process and technology described herein, as well as further methods, processes and technologies which may be developed through ongoing experimentation with, and advances and refinements of, the principles, methods and techniques outlined herein, will make possible the production of vertical three dimensional images and animated image sequences which will be adaptable to and controllable by an interactive interface for the purpose of providing control by and interactivity with the viewer.

Another object is to provide a vertical 3D imaging method that by the method, process and technology described herein, as well as further methods, processes and technologies which may be developed through ongoing experimentation with, and advances and refinements of, the principles, methods and techniques outlined herein, will make possible the production of side, rear and/or other angle views, of vertical three dimensional images and animated image sequences, in a digital format for use on single, dual or multiple electronic display screens, which will allow for the same image to be presented simultaneously to two or more viewers in a manner which will present the correct angle of view of the same image to each individual viewer based on the viewer's relative position to each other.

Another object is to provide a vertical 3D imaging method that by the method, process and technology described herein, as well as further methods, processes and technologies which may be developed through ongoing experimentation with, and advances and refinements of, the principles, methods and techniques outlined herein, will make possible the creation of vertical three dimensional images and animated image sequences by video production and related production technologies.

Another object is to provide a vertical 3D imaging method that by the method, process and technology described herein, as well as further methods, processes and technologies which may be developed through ongoing experimentation with, and advances and refinements of, the principles, methods and techniques outlined herein, will make possible the development of, and the production of vertical three dimensional images by the use of, a customized platform for the specific and specialized positioning and handling of photography and video production equipment for the creation of vertical three dimensional images and animated image sequences by photography and video production and related production technologies.

Another object is to provide a vertical 3D imaging method that by the method, process and technology described herein, as well as further methods, processes and technologies which may be developed through ongoing experimentation with, and advances and refinements of, the principles, methods and techniques outlined herein, will make possible the development of, and the production of vertical three dimensional images by the use of, automated image processing software and systems which will provide the capability for various applications of vertical three dimensional images and animated image sequences which might otherwise not be commercially practical or technically feasible.

Another object is to provide a vertical 3D imaging method that by the method, process and technology described herein, as well as further methods, processes and technologies which may be developed through ongoing experimentation with, and advances and refinements of, the principles, methods and techniques outlined herein, will make possible the production of vertical three dimensional images and animated image sequences by live-feed video capture which, when used in conjunction with automated image processing software and systems, will provide the capability for real-time display and viewing.

Another object is to provide a vertical 3D imaging method that provides a new and unique 3D display option for potential commercial users.

Another object is to provide a vertical 3D imaging method that provides the option to create 3D images and animated image sequences with all of the dimensional perspective forward and above the plane of display.

Another object is to provide a vertical 3D imaging method that provides the option to create 3D images and animated image sequences capable of presenting the dimensional perspective both above and below the plane of display.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 5 is a computer display, image processing view and shows the primary subject (3), the secondary subjects (4), the central registration line (5), the outline of the computer display (14), the registration match line (15), the left registration guide line of the right anaglyphic or stereoscopic image (16), the right registration guide line of the right anaglyphic or stereoscopic image (17), the left registration guide line of the left anaglyphic or stereoscopic image (18), the right registration guide line of the left anaglyphic or stereoscopic image (19) and the top-of-screen intersection matching point (20).

DESCRIPTION OF THE PREFERRED EMBODIMENT

Figure 1:
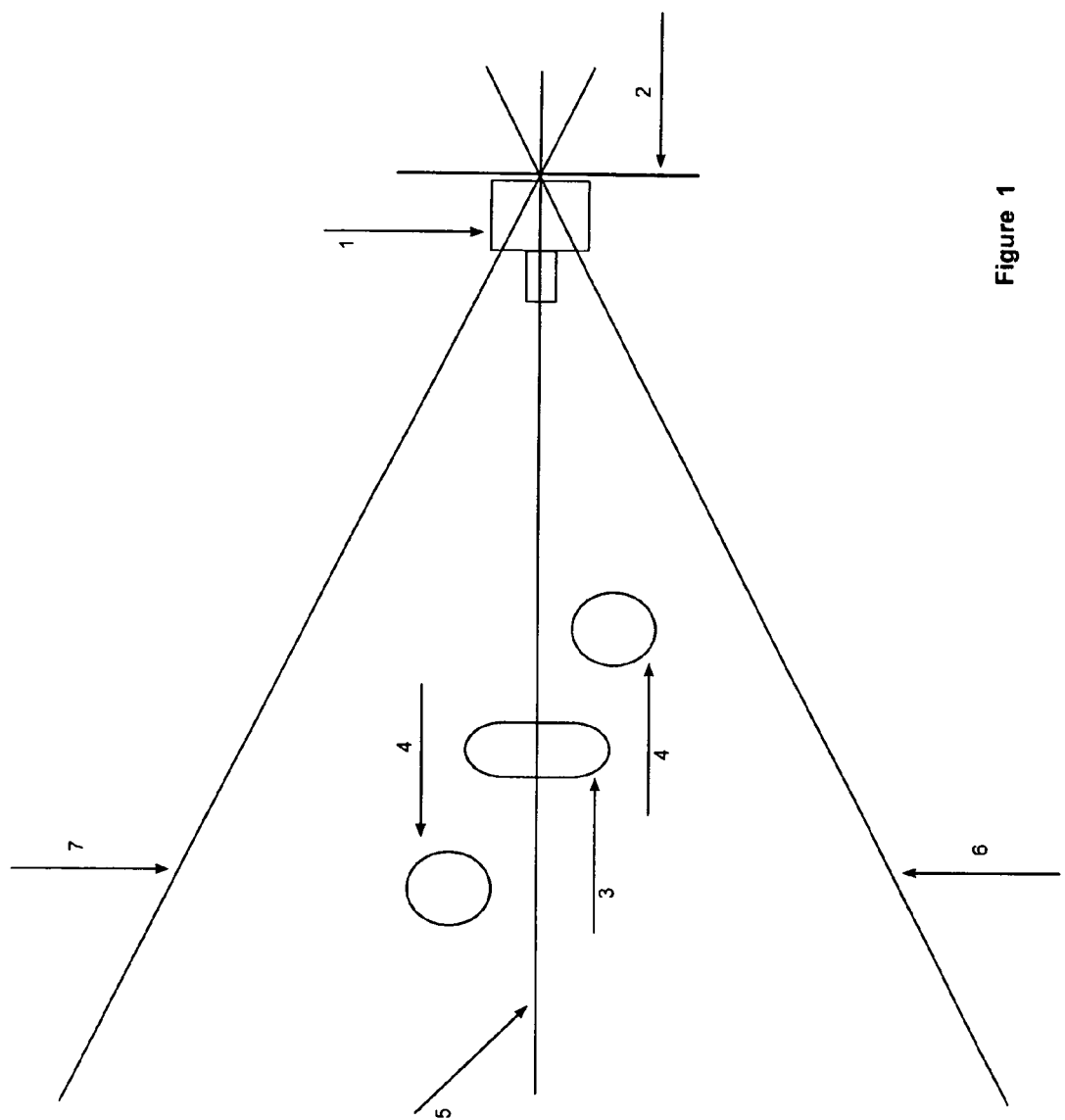
FIG. 1 is a top view of the image scene and camera position and shows the camera (1), the film plane (2), the primary subject (3), the secondary subjects (4), the central registration line (5), the left border camera view (6) and the right border camera view (7).

Turning now descriptively to the drawings, in which similar reference characters denote similar elements throughout the several views, the attached figures illustrate a vertical 3D imaging method, which comprises the processes of a new and unique imaging method which involves the following elements:

a specific camera placement for height and distance from the primary subject;

a specific camera angle of look-down;

a specific focal length of camera lens;

a specific placement of the central registration line;

a specific placement of left and right registration guide lines;

the creation of left and right anaglyphic or stereoscopic images, each with left and right registration guide lines equal in distance of separation to the distance of separation between the left and right registration guide lines of the original image scene;

the superimposing of left and right anaglyphic or stereoscopic images over each other;

the placement of the registration match line;

the matching of the left registration guide line of the right anaglyphic or stereoscopic image to the registration match line; and the precise alignment and matching of the registration guide lines in both of the left and right anaglyphic or stereoscopic images with the registration match line.

Referring to FIG. 1, which is a top view of the image production scene and camera position, the drawing shows the specific relationship of the related positions of the camera (1), the film plane (2), the primary subject (3), the secondary subjects (4), the central registration line (5), the left border camera view (6) and the right border camera view (7) wherein the central registration line (5) is precisely placed thru the image scene exactly along and parallel to the center line of the image scene and the exact center line of the camera lens, and exactly perpendicular to the film plane, to align the first camera position at the exact center of the image scene. Variations in the method of placing and using the central registration line (5) will be dependant on the image processing software used and whether the image is created by photography or by computer graphics.

Figure 2:
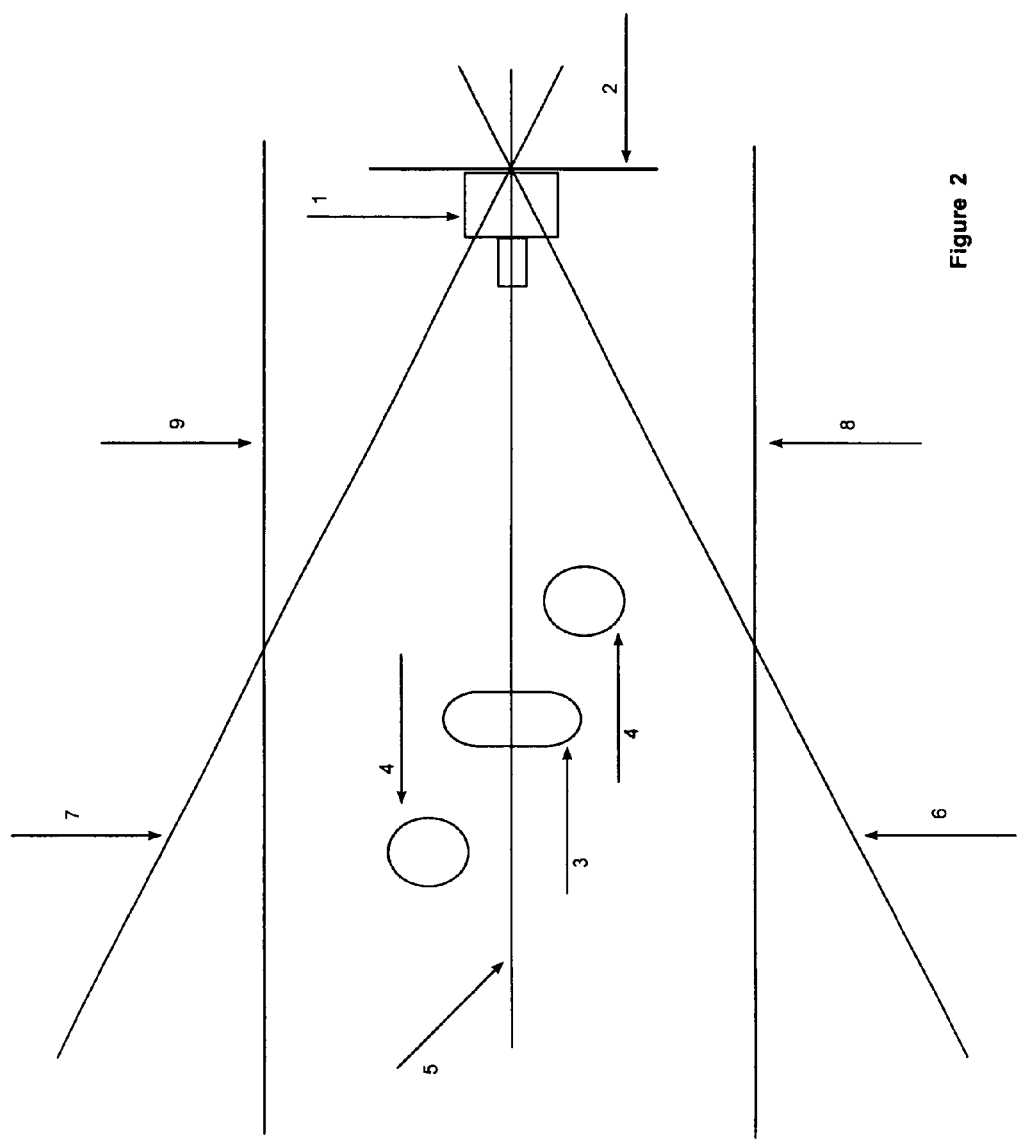
FIG. 2 is a top view of the image scene and camera position and shows the camera (1), the film plane (2), the primary subject (3), the secondary subjects (4), the central registration line (5), the left border camera view (6), the right border camera view (7), the left side registration guide line (8) and the right side registration guide line (9).

Referring to FIG. 2, which is a top view of the image production scene and camera position, the drawing shows the specific relationship of the related positions of the camera (1), the film plane (2), the primary subject (3), the secondary subjects (4), the central registration line (5), the left border camera view (6), the right border camera view (7), the left side registration guide line (8) and the right side registration guide line (9) wherein the left side registration guide line (8) and the right side registration guide line (9) are each placed exactly equidistant from the central registration line (5). The specific total distance between the left side registration guide line (8) and the right side registration guide line (9) is variable and may differ somewhat for production of different images based on the desired framing of each different image scene. Variations in the method of placing and using the left side registration guide line (8) and the right side registration guide line (9) will be dependant on the image processing software used and whether the image is created by photography or by computer graphics.

Figure 3:
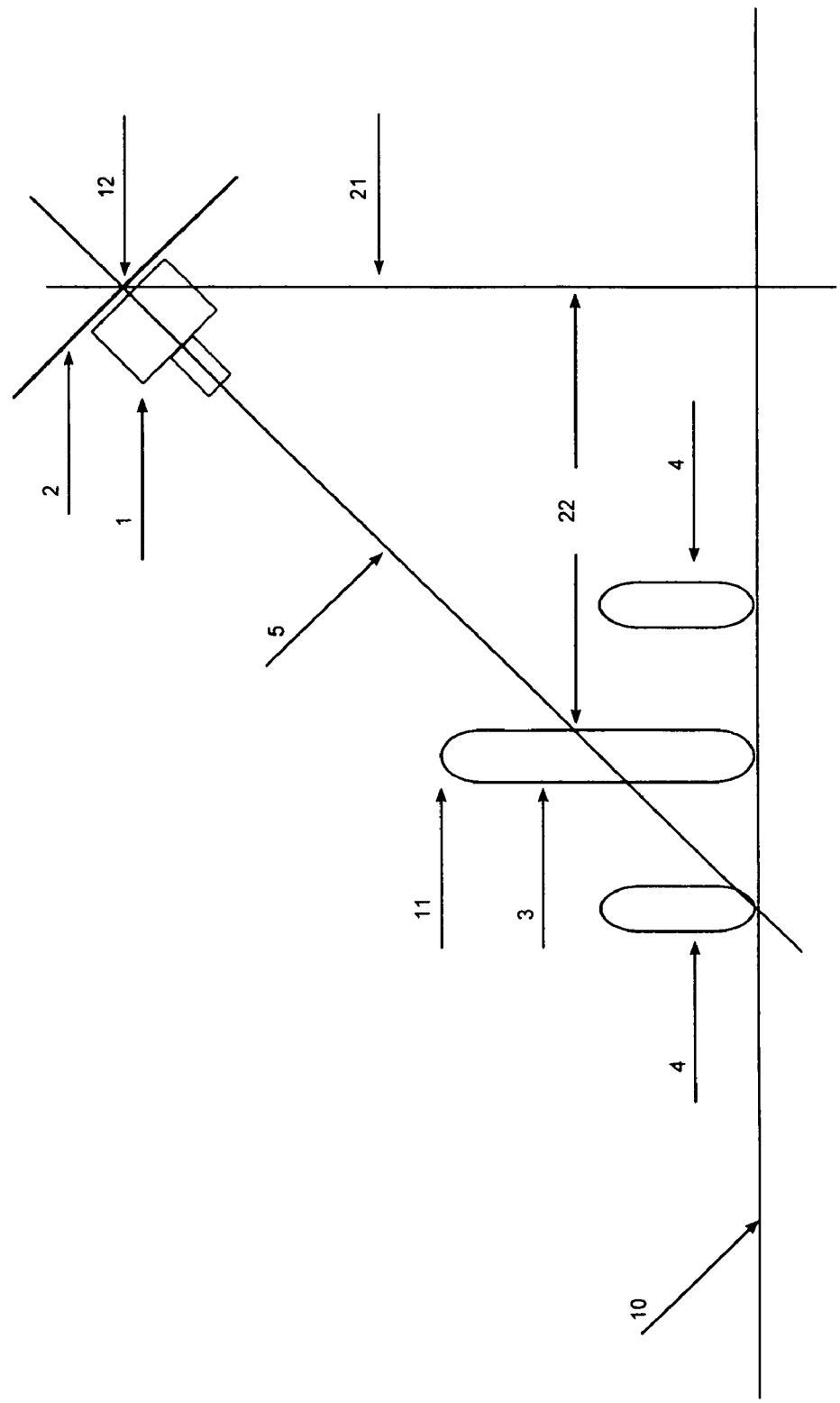
FIG. 3 is a side view of the image scene and camera position and shows the camera (1), the film plane (2), the primary subject (3), the secondary subjects (4), the central registration line (5), the ground plane (10), the primary subject height (11), the film plane height (12), the camera position and look-down angle reference line (21) and the film plane distance (22) back from the primary subject (3).

Referring to FIG. 3, which is a side view of the image production scene and camera position; the drawing shows the specific relationship of the related positions of the image subjects and camera position and shows the camera (1), the film plane (2), the primary subject (3), the secondary subjects (4), the central registration line (5), the ground plane (10), the primary subject height (11), the film plane height (12) the camera position and look-down angle reference line (21) and the film plane distance (22) back from the primary subject (3) wherein the film plane height (12) is approximately two times the height of the primary subject (3) and the film plane distance (22) back from the primary subject (3) is approximately one and a half times the height of the primary subject (3). The specific position of the film plane (2) relative to the height above and distance back from the primary subject (3) is variable and may differ for production of different images based on the desired framing of each different image scene.

Figure 4:
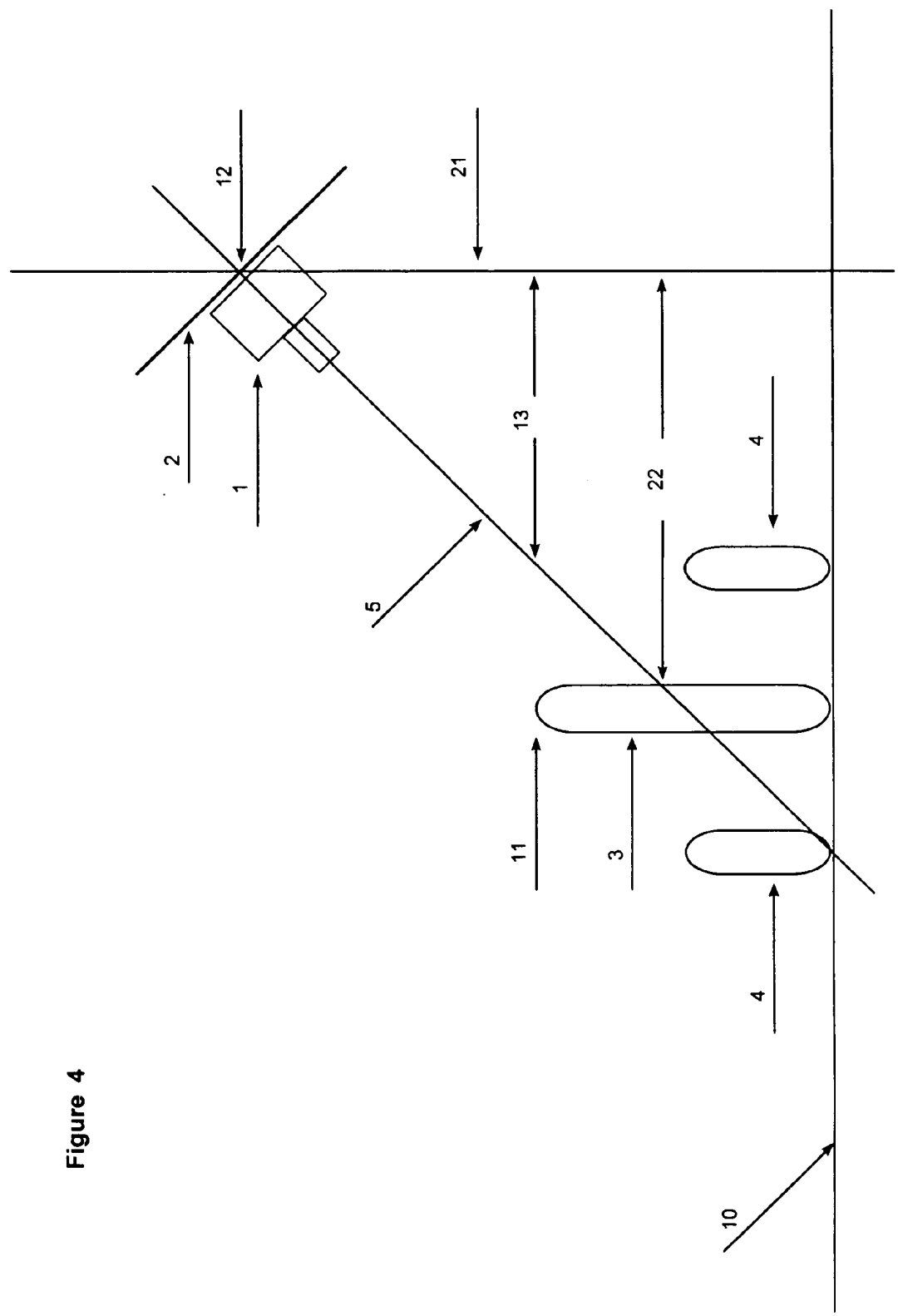
FIG. 4 is a side view of the image scene and camera position and shows the camera (1), the film plane (2), the primary subject (3), the secondary subjects (4), the central registration line (5), the ground plane (10), the primary subject height (11), the camera and film plane height (12), the camera look-down angle (13) and the camera position and look-down angle reference line (21)) and the film plane distance (22) back from the primary subject (3).

Referring to FIG. 4, which is a side view of the image production scene and camera position, the drawing shows the specific relationship of the related positions of the image subjects, the camera position and the camera look-down angle and shows the camera (1), the film plane (2), the primary subject (3), the secondary subjects (4), the central registration line (5), the ground plane (10), the primary subject height (11), the film plane height (12), the camera look-down angle (13) the camera position and look-down angle reference line (21) and the film plane distance (22) back from the primary subject (3) wherein the camera look-down angle (13) is set to direct the view of the camera to approximately forty-five degrees forward of the camera position and look-down angle reference line (21). The specific setting of camera look-down angle (13) is variable and may differ slightly for production of different images based on the desired framing of each different image scene.

Referring to FIG. 5, which is a view of a computer display during the final stages of image processing, the drawing shows the primary subject (3), the secondary subjects (4), the central registration line (5), the outline of the computer display (14), the registration match line (15), the left registration guide line of the right anaglyphic or stereoscopic image (16), the right registration guide line of the right anaglyphic or stereoscopic image (17), the left registration guide line of the left anaglyphic or stereoscopic image (18), the right registration guide line of the left anaglyphic or stereoscopic image (19) and the top-of-screen intersection matching point (20) for the left registration guide line of the right anaglyphic or stereoscopic image (16) and the left registration guide line of the left anaglyphic or stereoscopic image (18) to be lined up exactly matching with the intersection of the registration match line (15) at the specific point where the registration match line (15) intersects precisely with the top-of-screen intersection matching point (20) at the top of the outline of the computer display (14).

Following the proper setting of all component elements as described in references to FIGS. 1, 2, 3 and 4 above, the left and right anaglyphic or stereoscopic images are each taken at an equal distance to the left and right of the central registration line with a left registration guide line and a right registration guide line set at the left and right side of the frame of each of the anaglyphic or stereoscopic images exactly equal in distance from the center line of each respective anaglyphic or stereoscopic frame as are the right and left registration guide lines from the central registration line of the original first camera position. The left and right anaglyphic or stereoscopic images are created by the standard anaglyphic or stereoscopic procedure of moving the camera to equidistant positions to the left and right of the center of the image frame and recording an image at each position. Variations in the method of creating the anaglyphic or stereoscopic images will be dependant on the image processing software used and whether the image is created by photography or by computer graphics.

The left and right anaglyphic or stereoscopic images are then superimposed over each other with all side, top and bottom borders of each anaglyphic or stereoscopic image frame exactly matched and exactly lined up over each other. In doing so, the left and right registration guide lines of each respective anaglyphic or stereoscopic image will be lined up parallel to each other but will be offset from each other by the same amount of distance as was set between the two images when each was recorded. Variations in the method of superimposing will be dependant on the image processing software used and whether the image is created by photography or by computer graphics.

The registration match line is then placed vertically from top to bottom across the computer display, image processing view, and exactly parallel to the left registration guide line from the original first camera position. It is specifically placed so that the top point of the line intersects the top point of the left registration guide line of the right anaglyphic image where that line intersects the top outline of the computer display, image processing view, which then, by the intersection of these two points, defines the top-of-screen intersection matching point. Variations in the method of placing and using the registration match line will be dependent on the image processing software used and whether the image is created by photography or by computer graphics.

At this point in the process, the two separate and distinct anaglyphic or stereoscopic images are linked together by standard computer graphics imaging processes, as two joined layers of one common image to allow for manipulation of the images together and in equivalent fashion as one combined image. Variations in the method of linking the images together will be dependant on the image processing software used and whether the images are created by photography or by computer graphics.

At this point the left registration guide line of the right anaglyphic or stereoscopic image is moved and positioned to precisely match and overlay the registration match line by manipulating it to bring the point at which it crosses the bottom outline of the computer display, image processing view to a position exactly matching where the bottom point of the registration match line crosses the bottom outline of the computer display, image processing view. This will then bring all registration guide lines to exact parallel match with the registration match line, which provides the correct positioning of all registration guidelines necessary to completing the creation of vertical 3D image. Variations in the method of moving and manipulating the line will be dependant on the image processing software used and whether the image is created by photography or by computer graphics.

At this point, the anaglyphic or stereoscopic images are un-linked by standard computer graphics imaging processes, to allow for each to be further manipulated separately to perform the next step in the process. Variations in the method of un-linking the images will be dependant on the image processing software used and whether the images are created by photography or by computer graphics.

At this point, the left registration guide line of the left anaglyphic or stereoscopic image is moved to precisely match and overlay the left registration guide line of the right anaglyphic or stereoscopic image, which effectively brings all registration guide lines on each respective side of the anaglyphic or stereoscopic images to an exact position and overlay match with each other. This is the final step specific to the vertical 3D imaging method which creates the visual illusion in the final displayed image of a three dimensional image which is seen to project vertically upwards from the image display surface and which gives the impression of a three dimensional image in a vertical and up-right orientation relative to the placement of the image display surface and the viewing position of the viewer, as previously described herein. Variations in the method of moving the registration guide line will be dependant on the image processing software used and whether the images are created by photography or by computer graphics.

At this point, the two anaglyphic or stereoscopic images are combined by standard computer graphics imaging processes, in this final positional relationship, which creates the final and completed vertical 3D image, which is now ready for standard computer graphics processing for various forms of printed output or electronic display. Variations in the method of combining and processing the images for output or display will be dependant on the image processing software used and whether the images are created by photography or by computer graphics.

The interconnection of the component elements of the basic procedures of the vertical 3D imaging method involves: 1. specific camera placement for height and distance from the primary subject, 2. specific camera angle of look-down, 3. specific focal length of camera lens, 4. specific placement of the central registration line, 5. specific placement of left and right registration guide lines, 6. creation of left and right anaglyphic or stereoscopic images, each with left and right registration guide lines equal in distance of separation to the distance of separation between the left and right registration guide lines of the original image scene, 7. superimposing of left and right anaglyphic or stereoscopic images over each other, 8. placement of the registration match line, 9. matching of the left registration guide line of the right anaglyphic or stereoscopic image to the registration match line, and 10. precise alignment and matching of the registration guide lines in both of the left and right anaglyphic or stereoscopic images with the registration match line. And for purposes of display, the vertical three dimensional images are intended for viewing on various types of visual display media including printed on paper and/or plastic and displayed electronically on CRT, LCD, LED, OLED and/or plasma display screens and other yet to be developed display devices and/or technologies which may provide further opportunities to expand the potential uses and applications of the invention.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method of creating an image of an object, comprising the steps of:
   providing a camera having a film plane;
   positioning said camera at an elevated position relative said object;
   establishing an imaginary central registration line between said object and said camera that is perpendicular to said film plane;
   establishing a right side registration guideline that is parallel to said central registration line;
   establishing a left side registration guide line that is parallel to said central registration line, wherein both said right side registration guide line and said left side registration guide line are a predetermined distant apart and equidistant from said central registration line;
   moving said camera left of said central registration line and taking a left image;
   establishing side registration guidelines for said left image that are spaced apart by said predetermined distance;
   moving said camera right of said central registration line an taking a right image;
   establishing side registration guidelines for said right image that are spaced apart by said predetermined distance;
   establishing a registration match line; and
   superimposing said right image and said left image by orienting said side registration guidelines for said right image and said side registration guidelines for said left image in relation to said registration match line.

* * * * *